US005303090A

United States Patent [19]
Burr et al.

[11] Patent Number: 5,303,090
[45] Date of Patent: Apr. 12, 1994

[54] APPARATUS FOR ADJUSTING THE POSITION OF A DRAWTUBE IN AN OPTICAL INSTRUMENT

[75] Inventors: James D. Burr, 1960 Jefferson Co. Rd. 23, Evergreen, Colo. 80439; Rick McWilliams, Mountain View, Calif.

[73] Assignee: James D. Burr, Evergreen, Colo.

[21] Appl. No.: 951,678

[22] Filed: Sep. 24, 1992

[51] Int. Cl.$^5$ .............................................. G02B 7/02
[52] U.S. Cl. ........................ 359/823; 359/896; 359/425
[58] Field of Search ............ 359/383, 698, 819, 823, 359/825, 896; 358/229

[56] References Cited

U.S. PATENT DOCUMENTS

| | | | |
|---|---|---|---|
| 3,851,952 | 12/1974 | Werz et al. | 359/825 X |
| 4,478,491 | 10/1984 | Kawai | 359/825 X |
| 4,640,578 | 2/1987 | Turner et al. | 359/823 X |
| 4,929,073 | 5/1990 | Plante et al. | 359/819 X |
| 4,961,115 | 10/1990 | Jessop | 358/229 |
| 4,993,801 | 2/1991 | Sarraf | 359/820 X |
| 5,053,794 | 10/1991 | Benz | 359/819 X |

Primary Examiner—Edward K. Look
Assistant Examiner—Hoang Nguyen
Attorney, Agent, or Firm—Kolisch, Hartwell, Dickinson, McCormack & Heuser

[57] ABSTRACT

An apparatus is herein provided for use in the adjustment of an ocular mechanism within an optical instrument, such apparatus including a base with an aperture at least partially surrounded by perimetrically conforming upstanding member. The apparatus further includes a hollow drawtube which holds the ocular mechanism and substantially matingly conforms to both the aperture and the upstanding member to provide for controlled passage of the drawtube through the aperture. The drawtube is held by a radially adjustable control shaft and a plurality of spaced bearings. The control shaft is selectively placed in rotating frictional engagement with the drawtube by linear, radial translation of the shaft.

5 Claims, 2 Drawing Sheets

APPARATUS FOR ADJUSTING THE POSITION OF A DRAWTUBE IN AN OPTICAL INSTRUMENT

BACKGROUND OF THE INVENTION

The present invention relates generally to optical instruments, and more particularly to an apparatus for use in adjusting ocular mechanism in such instruments to effect focus thereof. Although the invention has wide utility, it has proven particularly useful in the context of focusing a telescope and is described as such herein.

A conventional telescope, it will be appreciated, is a combination of two optical systems, such systems cooperating to bring a distant object into view. The systems, namely an eyepiece and an objective, are relatively positionally adjustable via apparatus known as an optical focuser. Most commonly, the focuser is mounted to the telescope objective and the eyepiece is carried by the focuser, the eyepiece being moved relative the objective to effect telescope focus. Focus is achieved when the primary principle focal point of the eyepiece is brought into coincidence with the secondary principle focal point of the objective.

In the past, telescope enthusiasts have focused their equipment using mechanism such as a sliding drawtube, a threaded focusing tube, or a rack and pinion combination. Although effective under limited circumstances, such mechanisms necessarily require the use of components machined to within precise tolerances and are therefore costly to manufacture and difficult to maintain. Where equipment does not meet the prescribed tolerances, whether it be due to careless construction or to inevitable wear between moving parts, the telescope will be plagued by problems related to rocking, slipping or even jamming of the eyepiece. A failure to meet desired tolerances will also lead to "slop" in the relative adjustment of optical systems and therefore to difficulty in bringing the telescope into focus. It is therefore an object of this invention to provide a focuser employing improved mechanism for use in dealing with problems related to inaccurate machining or component wear.

In an attempt to deal with the above-identified problems, at least one focuser has heretofore been developed which employs a pivotally adjustable rotating shaft to effect movement of an eyepiece by operative frictional engagement therewith. Such an apparatus, known generally as a Crayford focuser, maintains operative engagement between the rotating shaft and the eyepiece via biased pivoting of the shaft. This arrangement, however, fails to deal adequately with the problem of eyepiece-adjustment slop, pivot of the rotating shaft bringing about a corresponding change in the frictional force applied to the eyepiece. The change in the direction of the applied force may, in turn, lead to an improper distribution of stresses within the focuser, and thus to excessive wear. It is therefore an object of this invention to provide a focuser which includes improved mechanism for use in addressing the problem of "slop" in eyepiece adjustment.

Another problem with known Crayford focusers relates to the inadequate protection offered to the telescope eyepiece during the focusing operation, the eyepiece usually being carried through an aperture in a generally flat base. Although the eyepiece may be carried in a movable drawtube, the drawtube moves through the aperture with limited structural support. It is therefore an object of this invention to provide a focuser which offers improved protection to the eyepiece during focusing thereof.

These and other objects, which will become apparent upon reading further, are attained by the present invention as shown in the drawings and described in the specification set forth below.

SUMMARY OF THE INVENTION

Accordingly, an apparatus is herein provided for use in the adjustment of an eyepiece within a telescope, the apparatus including a base with an aperture at least partially surrounded by an upstanding portion which substantially conforms to the shape of the aperture. The apparatus, known generally as an optical focuser, is secured to the telescope's objective, and includes an eyepiece-carrying drawtube which is selectively moved through the aperture to effect telescope focus. The drawtube substantially matingly conforms to the shape of both the aperture and the upstanding member.

The drawtube, and thus the eyepiece, is held by frictional engagement with a radially adjustable control shaft and a pair of spaced roller bearings. The shaft and bearings collectively restrict horizontal movement of the drawtube, but controlledly allow drawtube movement along a longitudinal axis. Such movement is effected by rotation of the control shaft which is selectively rotatably fixed relative the focuser base, and thus the telescope objective.

Each roller bearing preferably applies a force against the drawtube of a magnitude substantially equivalent to the magnitude of the force applied by the other roller bearing, the combined roller bearing force being equal to and opposing the force applied to the drawtube by the control shaft. The force applied by each bearing includes a pair of perpendicular force components, one parallel to the force applied by the control shaft and one perpendicular to the control shaft force. The parallel components combine to oppose the control shaft force and the perpendicular components are equal to and oppose each other.

As an additional feature, the drawtube is provided with an elongate engagement region which defines a path along which the control shaft rolls. The length of the engagement region defines the extent of drawtube movement through the aperture, and thus the degree to which the eyepiece may be adjusted.

DETAILED DESCRIPTION OF THE INVENTION

Figure 1:
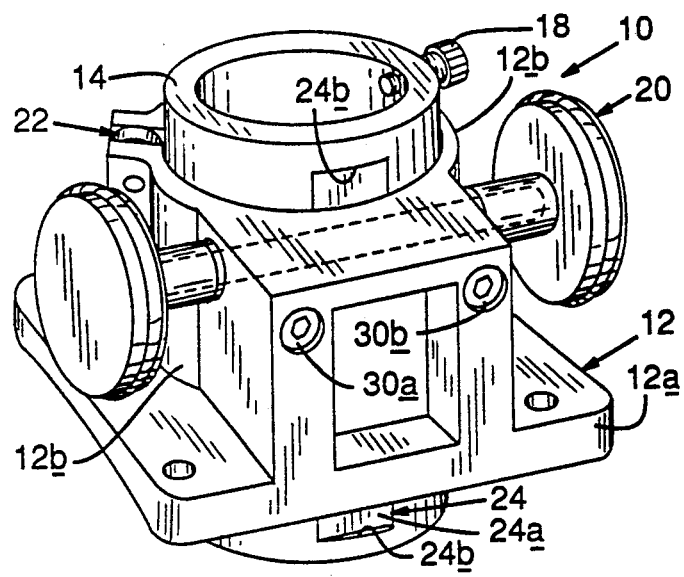
FIG. 1 is a perspective view of one embodiment of the invented focusing apparatus.

As stated above, the present invention relates to an apparatus which effects relative adjustment of ocular mechanism within an optical instrument. The invented apparatus may be used in various optical instruments, but has proven particularly useful in adjusting the eyepiece relative the objective in a conventional telescope to bring the telescope into focus. Alternative embodiments of the apparatus, commonly known as a focuser, have been depicted in the drawings and are indicated generally at 10 in FIGS. 1–3 and at 10' in FIGS. 4–6.

Beginning with a general overview of focuser 10, and referring for that purpose specifically to FIG. 1, the reader will see that the invented focuser includes as its principal components, a base 12 and a drawtube 14. The base, which is suited for attachment to a conventional telescope objective, serves as a reference relative to which the drawtube is controllably moved. The drawtube, as will become clear upon reading further, is particularly adapted for carriage of a telescope eyepiece such that movement of the drawtube effects telescope focus.

Figure 2:
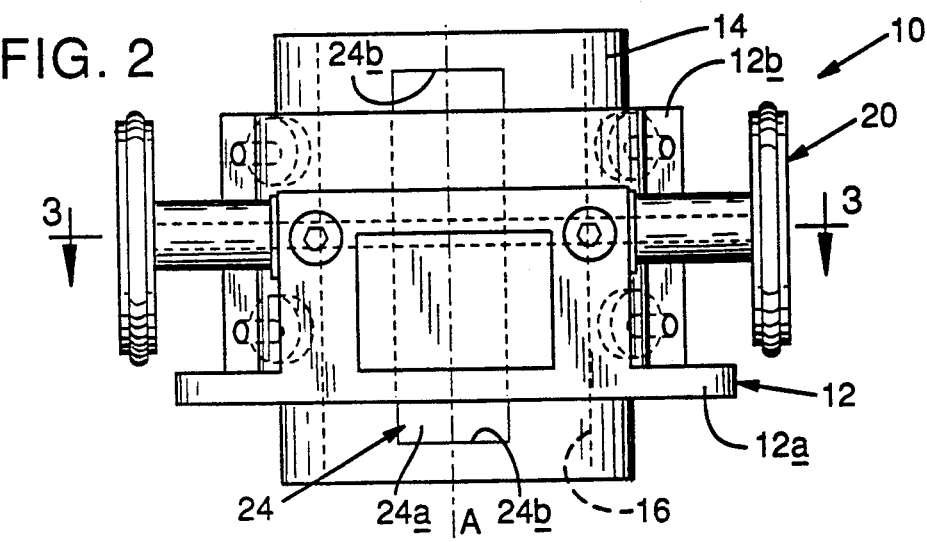
FIG. 2 is an elevational view of the apparatus depicted in FIG. 1.
Figure 3:
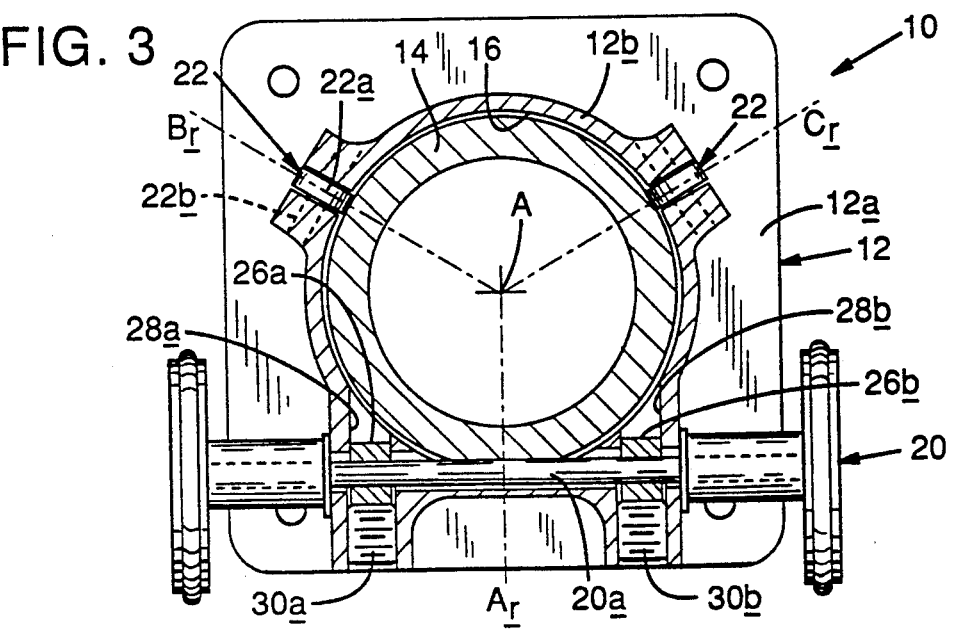
FIG. 3 is a sectional plan view of the apparatus depicted in FIGS. 1 and 2, the section being taken along line 3—3 in FIG. 2.

Directing attention momentarily to the particular characteristics of the focuser base, and bringing FIGS. 2 and 3 into the discussion, it will be noted that the base is a unitary structure having a generally horizontal mounting portion 12a and an elongate upstanding portion 12b. Both portions are generally rigid, each being of a thickness which provides for integrity of the base as a whole. The upstanding portion is substantially centrally located on the mounting portion and extends generally normally therefrom. The base is preferably milled, not cast, and is formed from a material such as aluminum. In this manner, a maximum of structural integrity is provided with a minimal of material and space.

As best shown in FIG. 3, base 12 defines an aperture 16, such aperture being generally centralized in its passage through the mounting portion. The aperture extends entirely through the base and is preferably circular so as to accommodate receipt of a cylindrical drawtube. The upstanding portion, which is also generally cylindrical in focuser 10, conforms substantially in cross-sectional shape and position to the aperture, the upstanding member extending perimetrically about the aperture. The interior of the upstanding portion and the aperture thus collectively define a path along which the drawtube is moved to effect telescope focus.

The mounting portion, as might be imagined, is adapted for attachment to a telescope objective, such portion defining a plurality of holes through which fasteners such as screws (not shown) pass. As indicated in FIG. 1, the mounting portion preferably defines an arcuate bottom surface, allowing for fitted attachment of the focuser to the objective of a Newtonian telescope, a telescope in which the eyepiece is secured to the side of the objective and radially adjusted relative the objective to effect focus.

Drawtube 14 is adapted to receive a telescope eyepiece such that the eyepiece may be adjusted relative the objective upon movement of the drawtube. Preferably, the drawtube is in the form of a cylinder having an exterior diameter slightly smaller than the interior diameter of aperture 16, allowing the drawtube to pass controlledly therethrough. The interior diameter of the drawtube is sized to allow for carriage of a telescope eyepiece therein. The eyepiece is held within the drawtube by a keeper such as screw 18 in FIG. 1.

Referring now to the mechanism by which drawtube 14 is moved, the reader will see that apparatus 10 further includes a control shaft assembly 20, such assembly being operatively interposed the drawtube and the base. The shaft assembly, as best shown in FIG. 3, includes an elongate shaft 20a which is selectively rotated to move the drawtube through the aperture along a longitudinal axis A. Generally opposite the control shaft are a plurality of roller bearings 22, such bearings being effective to oppose any lateral force component applied by the control shaft without unduly restricting longitudinal force components which cause translation of the drawtube. Such roller bearings, in the presently described embodiment, each include a roller 22a rotatably secured to an axle 22b, the axle being held adjacent opposite ends by upstanding member 12b. The roller bearings are spaced equally from a longitudinal plane defined by axes A and $A_r$, each roller being angularly offset relative that plane in an obtuse angle.

The control shaft is journalled to the base, being selectively translatable fixed relative the base and in frictional engagement with the drawtube. Drawtube translation may thus be effected by rotating frictional engagement of the control shaft against the drawtube. Although in the depicted embodiment, such rotation is accomplished by hand rotation of the control shaft, it is possible, as will be appreciated by those skilled in the art, to rotate the control shaft using a motor or other similar device.

To accommodate accurate drawtube translation, drawtube 14 defines an elongate engagement region 24, such region extending linearly along the drawtube's length. The engagement region is a recessed area on the drawtube's outer surface, defining an elongate, substantially planar tread area 24a bounded at opposite ends by stops 24b which act as boundaries to rotation of the shaft.

Focusing attention now on the mechanism by which the control shaft is brought into engagement with the drawtube, and referring specifically to FIG. 3, the reader will note that the control shaft is rotatably secured to the base on carriage structure which may take the form of or carriage $ elements 26a, 26b. Such carriages, it will be appreciated, slidably fit within slots 28a, 28b, respectively, allowing for limited shaft movement in a plane intersecting axis A. The shaft is selectively linearly urged into engagement with the drawtube by a pair of jacking screws 30a, 30b, such jacking screws effecting radial shift of the control shaft without restricting shaft rotation. Screws 30a, 30b constitute adjustable adjustors. As shown, the jacking screws, or jacking members engage the carriages in a plane defined by control shaft movement. By turning the jacking screws substantially equal amounts, the shaft is moved linearly along radial axis $A_r$, such movement compensating for wear to the engagement region and locking the shaft into rotating engagement with the drawtube.

When locked into rotating engagement with the drawtube and turned, the control shaft applies both radially inward and longitudinal force components against the drawtube, the longitudinal component effecting translation of the drawtube along axis A. The radial component, which is applied along axis $A_r$ in FIG. 3, is opposed by lateral force components applied by the roller bearings along radial axes parallel to radial axis $B_r$ and radial axis $C_r$. Such force components collectively restrict lateral movement of the drawtube during focuser operation. The force components along axis $B_r$ and $C_r$, force components applied by two of the roller bearings described above, may each be considered to include a pair of force components, one opposite in direction to the direction of the force component along axis $A_r$ and one perpendicular in direction to axis $A_r$. The perpendicular force components each of the axes $B_r$ and $C_r$ are equal and opposite and thus oppose one another.

Figure 4:
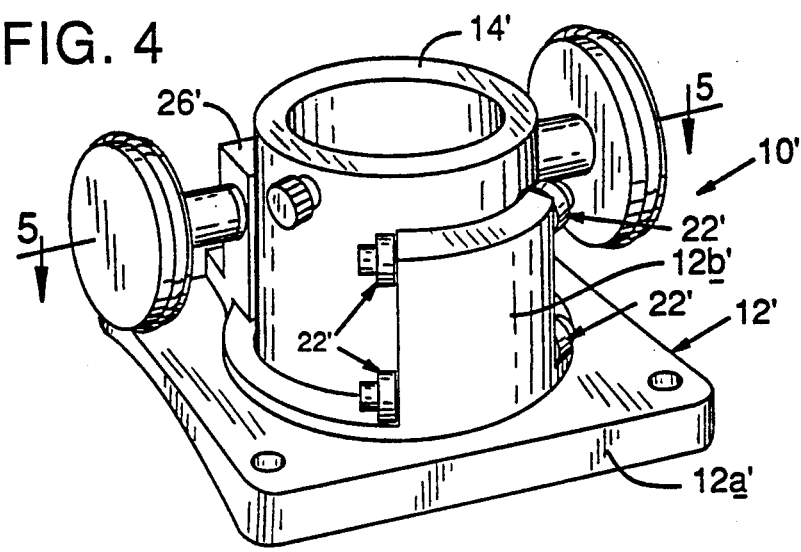
FIG. 4 is a perspective view of an alternative embodiment of the invented focusing apparatus.
Figure 5:
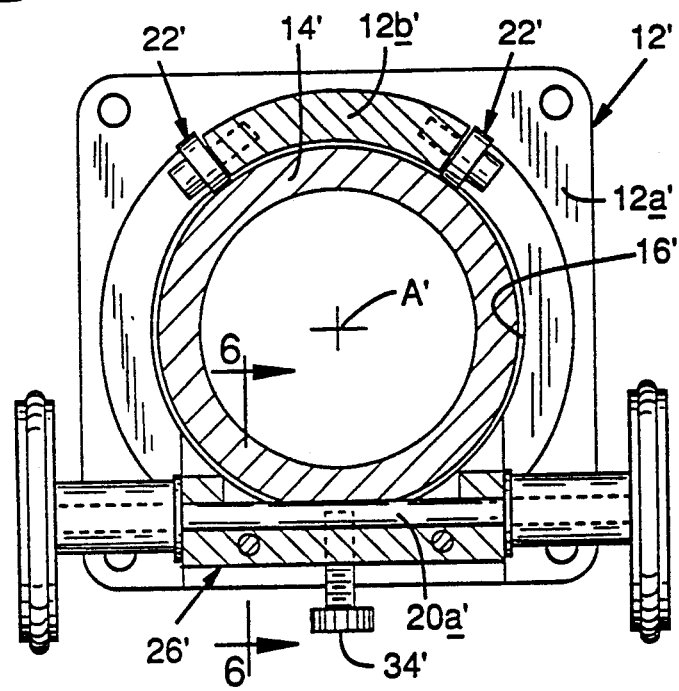
FIG. 5 is a sectional plan view of the apparatus depicted in FIG. 4, the section being taken generally along line 5—5 therein.
Figure 6:
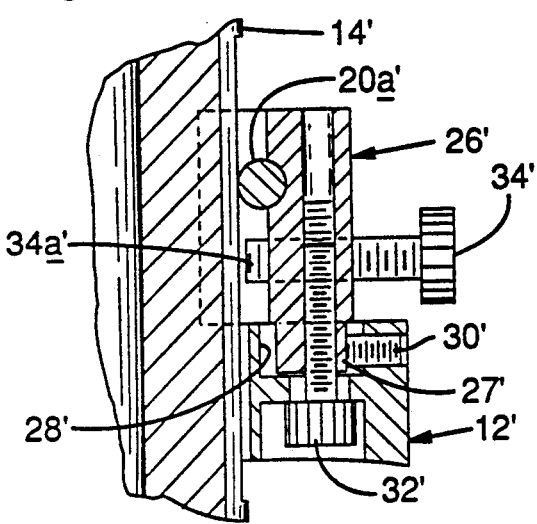
FIG. 6 is an enlarged, fragmentary, sectional view of the apparatus of FIG. 5 taken generally along lines 6—6 therein.

FIGS. 4-6 disclose an alternative embodiment of the invented focuser, the depicted focuser being referenced by primed reference numerals similar to those used to describe the focuser in FIGS. 1-3. Like the previously described focuser embodiment focuser 10' has a base 12' which includes a generally horizontal mounting portion 12a' and an upstanding member 12b'. The upstanding member substantially corresponds to the shape of at least a portion of a circular aperture 16' which passes through the base. A drawtube 14' is adapted to controllably pass through the aperture to effect adjustment of an eyepiece relative an objective.

The focuser also includes a control shaft 20a' which selectively engages the drawtube, as do roller bearings 22', to effect translation of the drawtube along a longitudinal axis A'. The control shaft is rotatably secured to a carriage 26' and the carriage is slidably mounted to the base. Referring specifically to FIG. 6, it will be noted that the carriage includes a carriage-supporting member 27' which is slidably received in a slot 28' within the base. Slot 28' allows for sliding linear adjustment of the carriage, and thus the shaft, relative the base. The carriage is selectively held in place by suitable fastening means such as bolt 32' so that the carriage may be secured to the base in a variety of positions.

Movement of the carriage within slot 28' is effected using a pair of jacking screws or jacking members, one of which is shown in at 30' in FIG. 6. By turning the jacking screws, force is exerted on the carriage, urging the carriage, and associated control shaft into engagement within the drawtube so that drawtube translation, and thus eyepiece focus, may be effected.

As best shown in FIGS. 5 and 6, the focuser may also include a brake mechanism 34'. Such mechanism generally in the form of a screw, braking being effected by tightening of the screw such that its end 34a' engages the drawtube. Contact between the brake mechanism, which is longitudinally fixed to the base, and the drawtube locks the drawtube in place. Frictional engagement of the control shaft against the drawtube is thus rendered ineffective in moving the drawtube due to a greater frictional force applied by the brake mechanism. Those skilled in the art will understand that such mechanism is equally suitable for use on focuser 10.

Although preferred embodiments of the invented apparatus have been described herein, it will be appreciated by those skilled in the art that alterations and adaptations of such embodiments may be made without departing from the scope of the invention as defined by the claims.

It is desired to secure by letters patent:

We claim:

1. An apparatus for use in adjusting ocular mechanism in an optical instrument, the apparatus comprising:
   a substantially rigid base with an aperture passing therethrough, said base including an upstanding member adjacent said aperture;
   a hollow drawtube controlledly movable through said aperture to effect adjustment of ocular mechanism held thereby, said drawtube having a flat expanse extending along a portion of the periphery thereof;
   a plurality of spaced bearings, mounted on said upstanding member, each operatively interposed between said upstanding member and said drawtube;
   a control shaft extending transversely of the drawtube and having a peripheral portion paralleling and contacting said flat expanse of said drawtube;
   carriage structure rotatably supporting said control shaft; and
   a mounting for said carriage structure on said base supporting the carriage structure for movement in a direction extending toward and away from said flat expanse.

2. The apparatus of claim 1, which further includes an adjuster for said carriage structure which is actuatable to adjust the position of said carriage structure in said path.

3. The apparatus of claim 1, wherein said carriage structure comprises a pair of carriage elements, and wherein said mounting defines a pair of channels for receiving respective ones of said elements.

4. The apparatus of claim 3, which further includes an adjuster for each carriage element adjustable to change the position of the carriage element.

5. The apparatus of claim 2, which further includes an adjustable member, adjustably supported on the mounting which is adjustable to bear against said flat expanse.

* * * * *